United States Patent
Mian et al.

(10) Patent No.: US 6,872,004 B2
(45) Date of Patent: Mar. 29, 2005

(54) BEARINGS

(75) Inventors: Abdulla Omar Mian, Rugby (GB); Robert Williams, Rugby (GB); Robert William Mee, Coventry (GB)

(73) Assignee: Dana Corporation, Toledo, OH (US)

( * ) Notice: Subject to any disclaimer, the term of this patent is extended or adjusted under 35 U.S.C. 154(b) by 89 days.

(21) Appl. No.: 10/275,146

(22) PCT Filed: Apr. 23, 2001

(86) PCT No.: PCT/GB01/01807

§ 371 (c)(1),
(2), (4) Date: Nov. 1, 2002

(87) PCT Pub. No.: WO01/84004

PCT Pub. Date: Nov. 8, 2001

(65) Prior Publication Data

US 2004/0062458 A1 Apr. 1, 2004

(30) Foreign Application Priority Data

May 3, 2000 (GB) .............................. 0010542

(51) Int. Cl.$^7$ ............................. F16C 9/02; F16C 33/10
(52) U.S. Cl. ..................................... 384/288; 384/291
(58) Field of Search ................................ 384/283, 287, 384/288, 289, 290, 291, 294, 429

(56) References Cited

U.S. PATENT DOCUMENTS 3,449,028 A * 6/1969 De Hart .................. 384/120
3,965,880 A 6/1976 Michael
4,235,481 A 11/1980 Fukuoka et al.
4,640,630 A 2/1987 Yoshioka et al.
5,139,349 A 8/1992 Nakano et al.
5,267,797 A 12/1993 Brandt
6,120,187 A * 9/2000 Ono et al. ................... 384/273
6,634,791 B2 * 10/2003 Ono et al. ................... 384/291

FOREIGN PATENT DOCUMENTS

GB 2 262 576 A 6/1993
GB 2 269 212 A 2/1994

OTHER PUBLICATIONS

International Search Report, 4 pages.
Patent Abstracts of Japan of 09177758.

* cited by examiner

Primary Examiner—Thomas R. Hannon
(74) Attorney, Agent, or Firm—Rader, Fishman & Grauer PLLC (57) ABSTRACT

A plain bearing is described, the bearing being fitted, in use, in an associated bearing housing, the bearing back in contact with said housing is substantially coextensive with the housing in the axial direction wherein the running surface of the bearing is relieved in both the axial and radial directions so as to reduce the contact bearing surface area with an associated shaft journal, in use.

20 Claims, 6 Drawing Sheets

BEARINGS

The present invention relates to plain bearings and particularly, though not exclusively, engine crankshaft bearings.

In their widest sense, the characteristics and dimensions of an engine are generally determined by the designer of the engine. For example, a four cylinder engine may have either a three or five main bearing crankshaft intended for it though nowadays, a five bearing crankshaft would almost certainly be employed. Each engine cylinder will have a connecting rod which will generally be provided with a bearing comprising two half shells. The maximum axial length of the bearing will be determined by the connecting rod thickness (axial length) which itself will be determined by the space available between the crank webs joining the big-end shaft journals to their adjacent main bearing shaft journals. Prior art bearings have almost invariably utilized virtually all of the possible available length for the provision of the maximum possible bearing area within the confines of what is available. In some cases, bearing area may be reduced by the provision of oil supply and distribution grooves and the like.

Some constructions of so-called flanged main bearings having integral thrust washers for controlling crankshaft end-float have necessarily not utilised all available axial length as bearing area as some available length has had to be sacrificed to allow for attachment means of separate flange members so as to avoid fouling of the crankshaft in the region of flange attachment. Examples of such bearings falling within this category may be found in U.S. Pat. No. 4,989,998 and U.S. Pat. No. 5,267,797.

U.S. Pat. No. 4,640,630 is concerned with a special bearing for a turbocharger rotor. The bearing described is a floating, generally cylindrical bush-type bearing which rotates both relative to its housing and also relative to the turbocharger shaft which it supports thus, the bearing is not fixed in its housing. Furthermore, the bearing has a reduced bearing area in the bore but this is to control the radial stiffness of the bearing which in turn is used to control vibrations that can have a detrimental effect on performance in very high rotational speed applications such as turbochargers. Other than giving an optimum range for the ratio of outside diameter length to inside diameter length, no other information is given.

The reason for maximising the bearing area is to provide as low a specific load on the bearing as possible during operation of the engine. Minimising the specific load is generally considered to provide other consequent bearing benefits such as lower oil operating temperature for any given engine speed and minimum bearing wear for example.

It is pointed out that in prior art bearings, there are the usual bearing features such as chamfers having corvex curvature, when viewed in section, on the bearing alloy at the bearing end faces which do tend to reduce bearing area by a small amount. However, in general the universally accepted bearing design philosophy is to maximise bearing area, especially on modern highly rated, high-revving engines.

Thus, in view of the above, it would be surprising if a bearing produced for a known engine and having a significantly reduced bearing area compared with that area in the "standard" engine bearing were to produce a bearing operating temperature lower than with the standard bearing.

According to the present invention, there is provided a plain bearing, the bearing having a running surface and wherein said running surface of said bearing is relieved in both the axial and radial directions so as to reduce the contact bearing surface area with an associated shaft journal, in use.

The plain bearing may be a separate bearing being fitted, in use, in an associated bearing housing, the bearing back being in contact with said housing and may be substantially co-extensive with said housing in the axial direction.

The plain bearing may be fixed in an associated housing in use, ie the bearing and housing maintain a fixed relationship and do not rotate relative to each other.

The plain bearing may comprise at least a strong backing material having a bearing alloy lining thereon.

The relief in bearings according to the present invention may be distinguished from ordinary chamfers frequently found at bearing ends in that known chamfers have a convex profile in cross section or a straight line extending directly from the bearing running surface to the outer edge of the bearing axial end face. The relief of bearings according to the present invention may be considered as a groove or rebate either extending to the axial end of the bearing end face or closely adjacent the bearing end face.

Bearings according to the present invention have been found to result in lower bearing running temperatures in spite of the reduction fin bearing surface area.

When a bearing is assembled into a housing, usually a split housing wherein each housing half contains a half bearing shell, there is a nominal clearance between the assembled bearing bore and the associated crankshaft journal about which the bearing is assembled. The clearance is to allow for the provision of an oil film to support the bearing and shaft journal in operation. In an engine, a main bearing in the crankcase is stationary and the rotating crankshaft journal is supported on an oil film whilst a big-end bearing in a connecting rod is driven by the engine piston and is supported by the shaft journal on an intervening oil film. The clearance allows for maintenance of the oil film under conditions where deflection of the bearing in its housing may occur and also allows for thermal expansion effects in operation.

As a factor of the nominal total clearance between the bearing bore and the associated shaft journal, it has been found that the radial clearance may be between a factor of ×2 to about ×15 the nominal total clearance based on the diameter of the bearing bore and the diameter of the shaft journal. For example, if the nominal clearance between bearing and shaft is 0.04 mm then the radial clearance in the relieved portion may lie in the range from about 0.08 to 0.60 mm.

The axial length of the relieved portion may be considered as a proportion of the maximum available bearing length which would be available without the axial relief. It has been found that an axial relief ranging from about 5 to about 40% of the available bearing length produces beneficial effects. A preferred range may be from about 10 to about 30%.

The relieved portions may be at one axial end of the bearing or at both axial ends. Where the relief is provided at the bearing axial ends, it preferable that the relief is disposed substantially symmetrically about the bearing length. As an example, if the total axial relief is 6 mm then this is preferably provided as two relieved portions each being of 3 mm axial length.

In some circumstances it is possible that the relief may be provided within the normal bearing area. However, it is to be understood that relief according to the bearing of the present invention is not constituted by prior art circumferential oil supply grooves. Indeed, the bearing area relieved portions of the present invention are generally provided in areas into which oil flows from a remote oil source as opposed to being features into which oil is supplied directly via a crankshaft oil supply drilling for example. Thus the relieved portions of the bearing of the present invention may receive oil from an oil supply groove which itself receives oil from a crankshaft oil supply drilling for example via an intervening portion of the unrelieved bearing surface in the case of an engine main bearing for example. A connecting rod bearing on the other hand may be supplied with oil from an oil supply hole in the associated shaft journal, the oil hole generally being situated about midway between the axial ends of the bearing so that the oil supply is axially outwardly towards the relived portions.

It is preferred that the relieved portions are provided in both halves of a bearing pair and that the relieved portions are circumferentially contiguous, i.e. that the relieved portions are circumferentially aligned in both halves. It is believed that there should be no "step" or lack of continuity of the relieved portion at the bearing joint face which would disturb the oil pools or vortices generated at the bearing regions containing the relieved portions. Thus, the relieved portions in one bearing half should blend smoothly with the relieved portions in the adjacent bearing half.

The reliefs of bearings according to the present invention should be free of obstructions to oil flow.

Although the relieved portions have been discussed above in terms of separate bearing half shell bearings, the present invention is also applicable to a bearing formed in a connecting rod, for example, which has been directly lined with a bearing alloy in the bore thereof such as by high velocity oxy-fuel spraying for example. The present invention would apply if axial and radial relief were applied so that not all of the available bearing length were lined with the bearing alloy so as to form what would otherwise be a "normal" bearing surface having a predetermined clearance over the whole axial length thereof.

Similarly, the present invention also applies to substantially cylindrical sleeve bearings where circular relieved portions may be provided in the bearing bore.

The present invention also includes bearings formed for example directly in an aluminium alloy connecting rod. Many small, low-revving, low power engines such as single cylinder engines used in lawn mowers and other horticultural equipment, for example, utilise a directly machined connecting rod material as the bearing per se.

Bearings according to the present invention may delay the onset of so-called bearing touchdown under high power, high speed conditions due to the increased oil viscosity stemming from the reduced oil temperature at a given engine speed.

It is believed that the reduced bearing operating temperatures demonstrated by bearings according to the present invention may be due to or influenced by turbulence or oil vortices being formed in the relieved portions and which assist in heat transfer from the bearing to the oil flowing from the bearing.

The relieved portions may be provided with features which assist in the formation and/or retention of oil vortices to cause re-entrainment of oil into the bearing. Such features may comprise lips, for example, formed in or adjacent the relieved portion.

It is further believed that reduced power loss may be induced secondary effects leading to a reduction in bearing operating temperature or reduced bearing temperature rise.

Bearings according to the present invention may comprise connecting rod big-end or main bearings or any other type of bearing, especially dynamically loaded bearings. However, bearings according to the present invention may find use in applications other than internal combustion engines, and examples of such use may include, but are not limited to: compressors, hydraulic gear pumps, propeller shaft bearings for ships and boats and any other bearings which are statically or dynamically loaded.

In order that the present invention may be more fully understood, examples will now be described by way of illustration only with reference to the accompanying drawings, of which.

Referring now to FIGS. 1 to 9 and where the same features are denoted by common reference numerals. It is to be noted that the embodiments described below are essentially schematic and not to scale.

Figures 1, 4, 5, 6:
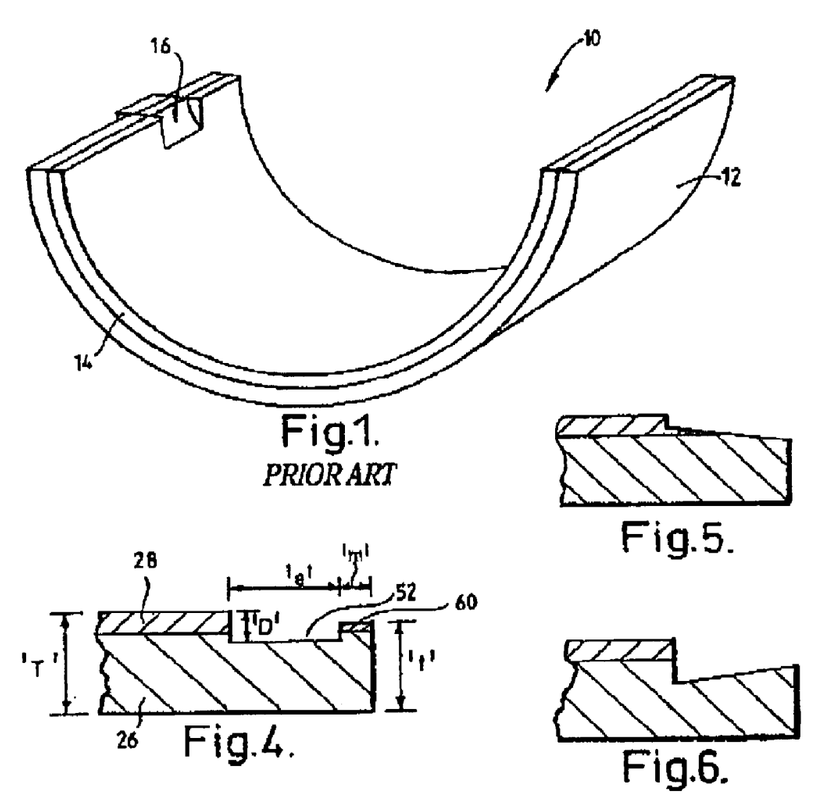
FIG. 1 shows a perspective view of a half bearing according to the prior art.
FIG. 4 shows a part cross section of a second embodiment of a bearing according to the present invention.
FIG. 5 shows a part cross section of a third embodiment of a bearing according to the present invention.
FIG. 6 shows a part cross section of a fourth embodiment of a bearing according to the present invention.

A prior art half-bearing for an internal combustion engine is indicated generally at 10 in FIG. 1, the bearing 10 comprises a strong backing 12 from a material such as steel for example and a bearing alloy lining 14 bonded to the backing 12, the lining co-operating, in use, with a shaft journal (not shown). The strong backing 12 may be any thickness from about 0.25 mm upwards. The bearing alloy lining layer 14 may be between about 0.25 mm and 1.5 mm in thickness and is frequently made from an aluminium alloy or a copper alloy. The bearing 10 may or may not be provided with a so-called overlay layer of an alloy which is softer than the alloy 14. Such overlay layers are usually in the range from about 15 to 50 μm in thickness, if present. The bearing alloy 14, in the example shown, extends substantially over the whole area of the bearing, i.e. there are no regions where the bearing alloy is cut away or removed other than at a nick 16 which is provided for axial alignment in an associated connecting rod.

Figure 2:
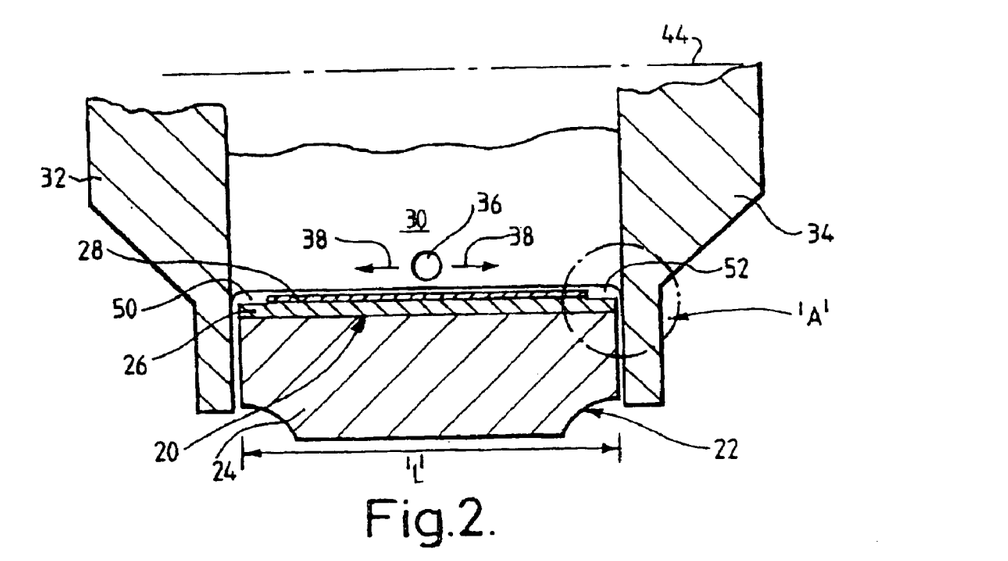
FIG. 2 shows a cross section through part of a schematic embodiment of a bearing according to the present invention and an associated bearing housing and crankshaft journal.
Figure 3:
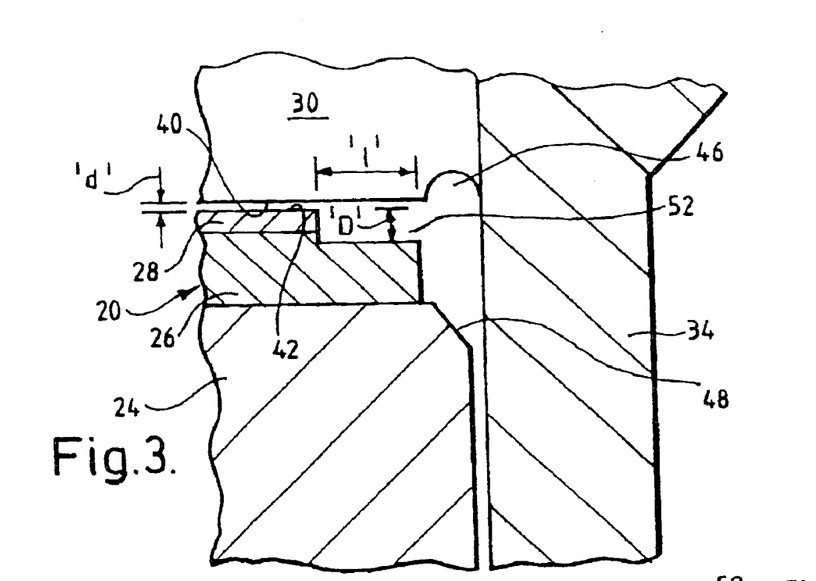
FIG. 3 shows an enlargement of the detail "A" of FIG. 2.

FIGS. 2 and 3 show a bearing 20, similar in general construction to that of the bearing 10 of FIG. 1, installed in a connecting rod 22 of an engine. The bearing comprises a steel backing 26 having a lining of a bearing alloy 28 thereon. Only part of the lower cap-half 24 of the rod 22 is shown together with part of the lower half bearing 20. When the connecting rod is assembled with two half bearings 20, it surrounds a crankshaft big-end journal 30 which is supported between two crankshaft webs 32, 34. The overall axial length of the bearing 20 is indicated in FIG. 1 as "L". When the connecting rod 22 and bearings 20 are assembled about the journal 30, there is a clearance indicated by "d" between the journal surface 40 and the bearing surface 42, the clearance "d" being defined as the difference in diameter between the bore of the bearing formed by the half shells 20 when assembled in the connecting rod 22 and the diameter of the shaft journal 30. The bearing axis is indicated at 44.

The bearings 20 according to the present invention as shown in FIGS. 2 and 3 are relieved in the bore at their axial ends by the provision of circumferential recesses 50, 52 which have a dimension "D" in the radial direction and a length "l" in the axial direction. The enlarged drawing of detail "A" shown in FIG. 3 also indicates a stress relieving groove 46 formed at the axial end of the shaft journal 30 and a chamfer 48 formed at the end of the bearing receiving bore of the connecting rod 24.

The shaft journal 30 has an oil supply hole 36 which, in the case of the tests described in detail below is supplied with oil independently and under controlled conditions as described below. In normal use, the same engine fitted to a vehicle has oil supplied to the oil hole 36 via a drilling in the crankshaft from an adjacent main bearing. However, the test engine and the normal road use engine both have in common the fact that oil is supplied to the bearing at a position (oil hole 30) such that it flows outwardly towards the relieved portions (as indicated by the arrows 38) to exit the bearing at both axial ends thereof to fall into the engine oil pan. Thus, where there are two relieved portions, one adjacent each bearing axial end, the oil is supplied intermediate the relieved portions to flow through the relieved portions and out of the bearing at the axial ends. This latter consideration of the relative dispositions of an oil supply hole and the relieved portions applies to all of the embodiments described below.

In FIGS. 2 and 3, the depth "D" is constant, however, this may not necessarily be the case as the depth "D" may vary along the axial length "l", as will be further described below.

FIG. 4 shows a second embodiment wherein the relieved portion 52 has a lip 60 lying axially outwardly thereof. The total wall thickness of the bearing is defined as "T" and the thickness of the wall at the position of the lip 60 is defined as "t" where t< or =T; but, t> (T−D). The axial length of the lip 60 is defined as "m" and may vary according to the actual dimensions of the bearing and clearances and with the actual engine application.

FIG. 5 shows a bearing having a relieved portion of non-uniform depth. The relieved portion slopes downwardly towards the axial end of the bearing at a constant angle. The depth "D" may be defined as the average depth from one end to the other of the relieved portion.

FIG. 6 shows a relieved portion having a reverse slope to that shown in FIG. 5. Again, the depth "D" may be defined as the average depth of the recess from one end to the other.

Figure 7:
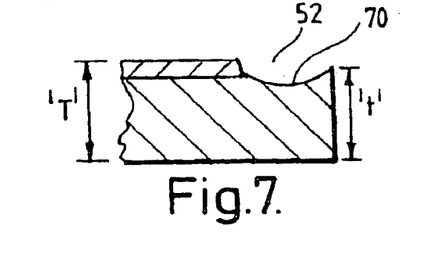
FIG. 7 shows a part cross section of a fifth embodiment of a bearing according to the present invention.

FIG. 7 shows a bearing wherein the recess 52 has a curved bottom 70. The wall thickness "t" at the outer axial end of the bearing may be equal to or less than "T". The depth "D" of this recess may be defined as that at the maximum depth of the curved bottom 70.

Figure 8:
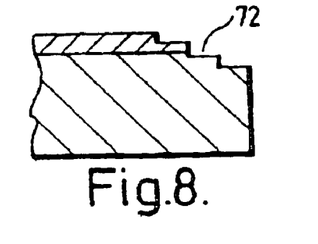
FIG. 8 shows a part cross section of a sixth embodiment of a bearing according to the present invention.

FIG. 8 shows a bearing having a stepped relieved portion 72. The example shown has three steps, however, there may be more or fewer.

Figure 9:
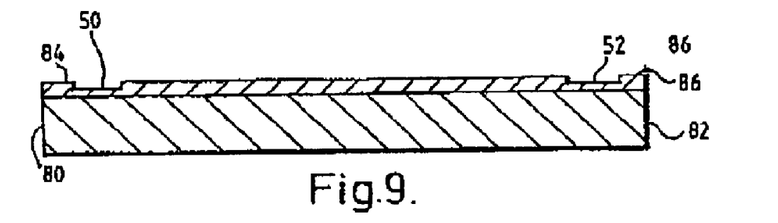
FIG. 9 shows a part cross section of a seventh embodiment of a bearing according to the present invention.

FIG. 9 shows an embodiment wherein two relieved portions 50, 52 are formed axially inwardly of the bearing ends 80, 82. The bearing surface portions 84, 86 axially outwardly of the recesses are not relieved in wall thickness and have a thickness "T" as defined above.

Tests were conducted with bearings made according to FIGS. 2 and 3 having various dimensions of "D" and "L" on a 4-cylinder, in-line, 16 valve, double overhead camshaft (DOHC) 2 liters engine having maximum power at 6000 rpm of 100 kW and maximum torque of 180 NM at 4000 rpm. Engine tests were conducted under the conditions set out in the table below.

|  | Engine | Test | Conditions |  |  |  |
|---|---|---|---|---|---|---|
| Engine Speed | 3000 | 4000 | 5000 | 5000 | 6000 | 6500 | RPM |
| Engine Load | Full | Full | Min | Full | Full | Full |  |
| Oil Temperature | 100 & 140 | 100 & 140 | 100 & 140 | 100 & 140 | 100 & 140 | 100 & 140 | ° C. |
| Oil Pressure | 2, 3, 4 & 5 | At | All | Speeds |  |  | bar |

In order to make the tests as representative as possible of the true effects of the relieved portions in bearings according to the present invention, the engine was modified so that oil under controlled conditions of flow rate, temperature and pressure could be fed directly to the big-end bearing. In the unmodified engine, oil is normally fed to the big-end bearings via oil drillings in the crankshaft webs and journal from the main bearing journals which in turn is supplied with oil under pressure from the integral engine oil pump through a gallery in the cylinder block. However, in the unmodified engine it is not possible to control the supply of oil to the big-end bearings or to monitor accurately the change in operating parameters due to the bearings of the present invention. For example, as the engine speed rises, the main bearing has a large effect on the pressure and quantity of oil reaching the big-end downstream thereof such that at high engine speeds the oil supply in the big-end bearings may cause starvation. In the modified testing engine, not only is it possible to accurately control the input oil parameters as described above but also to monitor accurately the change in bearing temperature. Oil is introduced into the modified engine via a drilling in the nose of the crankshaft so as to provide an independent oil feed to the big-end bearing, the normal oil supply drilling from the main bearing journal to the big-end being plugged. The oil supply is provided with full-flow meters to monitor oil flow and the bearing 20 being supplied with oil is also provided with thermocouples to monitor change in bearing temperature, the thermocouples (not shown) being positioned about 0.3 mm from the actual bearing surface. Thus, it is the change of bearing temperature which is recorded rather than oil temperature change. Full details of the modifications to the test engine may be found in the paper: "Measured crankshaft bearing oil flow and temperatures with a full and partial groove main bearing", by Mian, A. O; Parker, D. D.; Williams, B; SAE paper OOP-456, March 2000.

Figure 10:
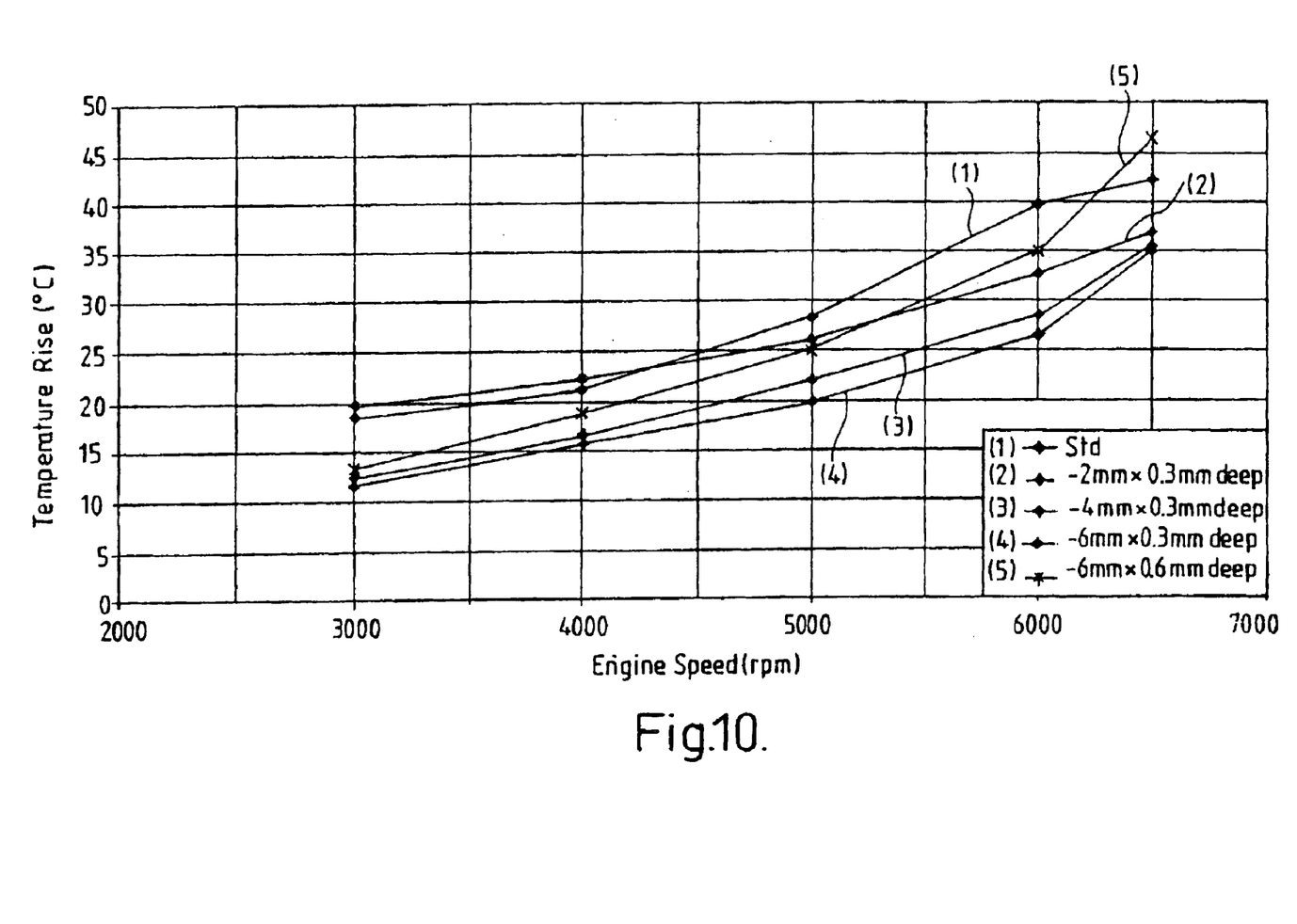
FIG. 10 shows a graph of bearing temperature rise vs engine speed for bearings according to the present invention having relieved portions having a range of dimensions compared with a "standard" bearing.

Reference to FIG. 10 shows the results of tests conducted where the temperature of the input oil feed is 100° C. at 2 bar. The change in bearing temperature is measured at a range of engine speeds from 3000 rpm to 6500 rpm. The bearings were "standard" (1), i.e. those bearings with which the engine is normally supplied when in a vehicle; bearings having relieved portions of 2 mm×0.3 mm deep (2), i.e. "D"=0.3 mm and "l"=3 mm at each axial end of the bearing; 4 mm×0.3 mm deep (3), i.e. "D"=0.3 mm and "l"=2 mm at each axial end of the bearing; 6 mm×0.3 mm deep (4), i.e. "D"=0.3 mm and "l"=3 mm at each axial end of the bearing; and, 6 mm×0.6 mm deep (5), i.e. "D"=0.6 mm and "l"=3 mm at each axial end of the bearing. In the test engine the radial clearance "d" was 0.02 mm giving a diametral clearance of 0.04 mm.

It may be clearly seen in FIG. 10 that as the dimension "l" increases from 1 to 3 mm at each axial end of the bearing, the bearing temperature rise (above oil feed temperature of 100° C.) continues to decrease. With an input, oil temperature of 100° C. at 6000 rpm, the bearing having a length "l" of 3 mm at each bearing end and a depth "D" of 0.3 mm according to the present invention has increased in temperature by approximately 26° C. whereas the standard bearing has risen in temperature by some 40° C. The effect of increasing dimension "l" from 1 mm to 3 mm at each axial end causes the bearing temperature rise to continue to fall. The effect of increasing the depth "D" from 0.3 mm to 0.6 mm at a dimension "D" of 3 mm at each axial end of the bearing produces a reduction in bearing temperature rise up to 6000 rpm after which the standard bearing produces a lower increase in bearing temperature rise.

Figure 11:
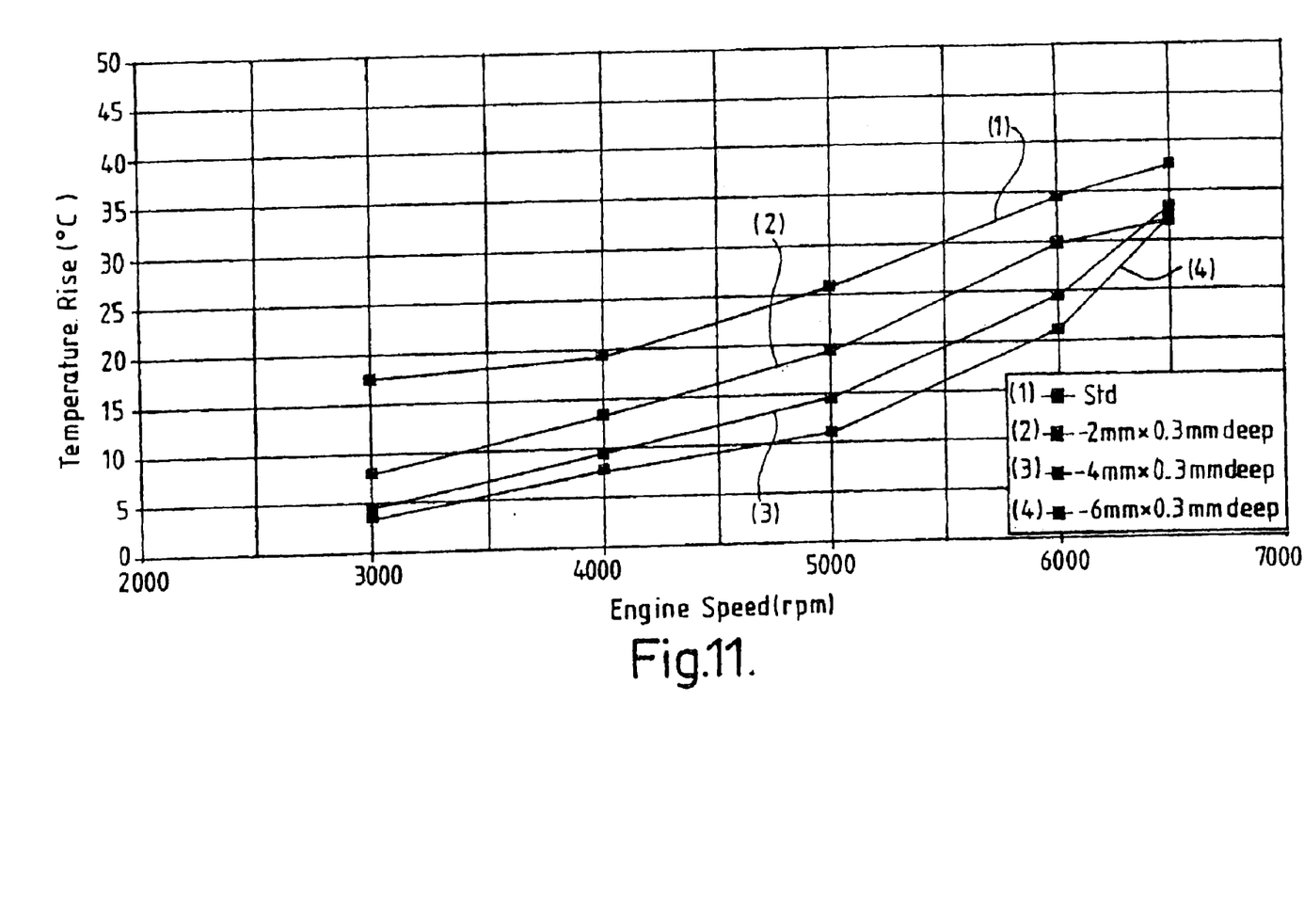
FIG. 11 shows a similar graph to that shown in FIG. 10 but with different test conditions.

FIG. 11 shows a similar graph to that of FIG. 10 except that the oil input temperature is 140° C. rather than 100° C. However, the same trend as demonstrated in FIG. 5 may clearly be seen in that the depth "D" of 0.3 mm and dimension "l" of 3 mm at each axial end of the bearing produces the lowest increase in bearing temperature rise across the speed range until about 6500 rpm when the there is concordance of temperature rise which is still some 5° C. or more less than the standard bearing. Again, there is the same trend of lower bearing temperature rise with increasing dimension "l" up to 3 mm at each axial end of the bearing.

Figure 12:
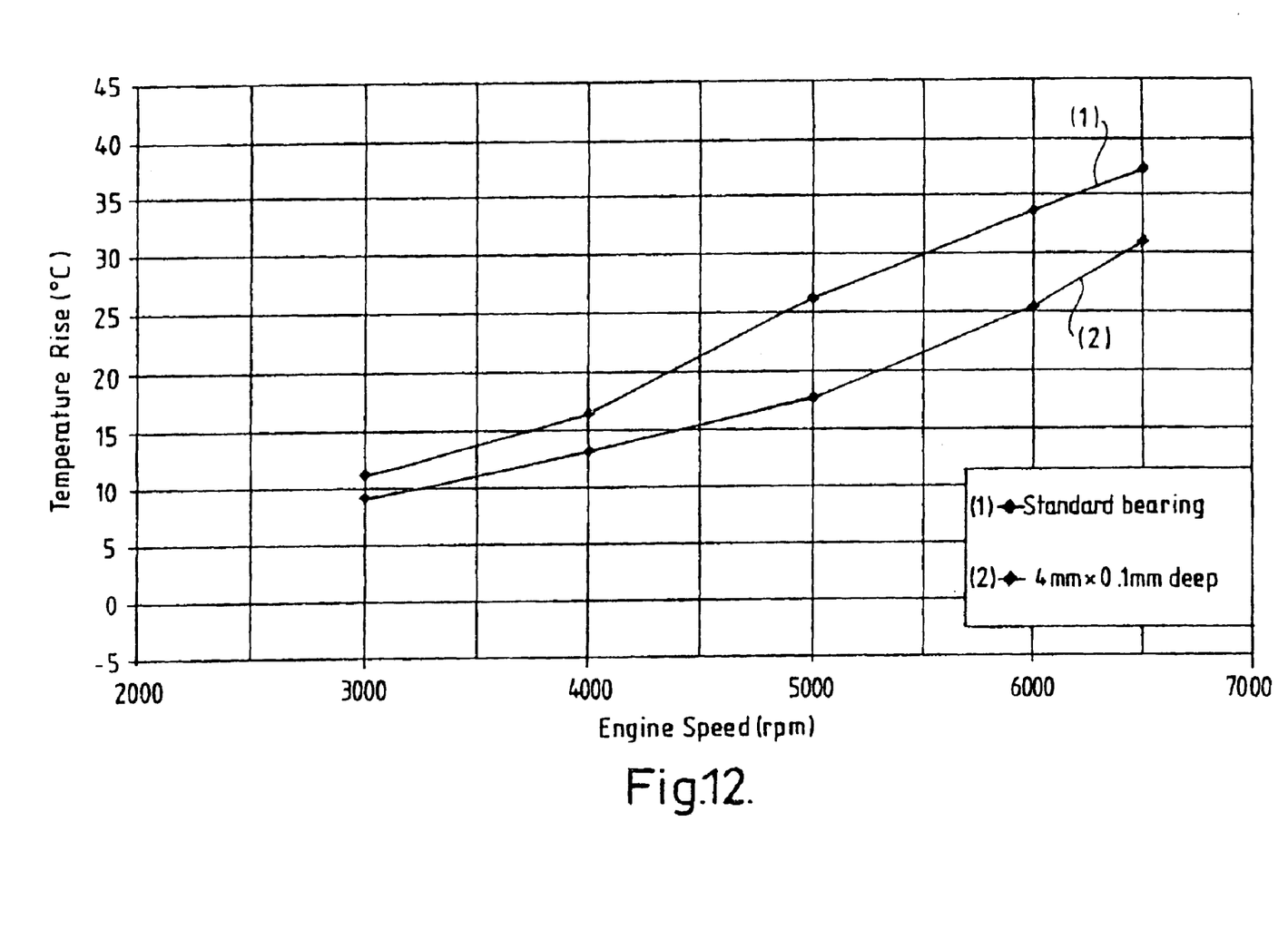
FIG. 12 shows a graph similar to FIG. 10 but with bearings according to the present invention having different dimensional parameters.
Figure 13:
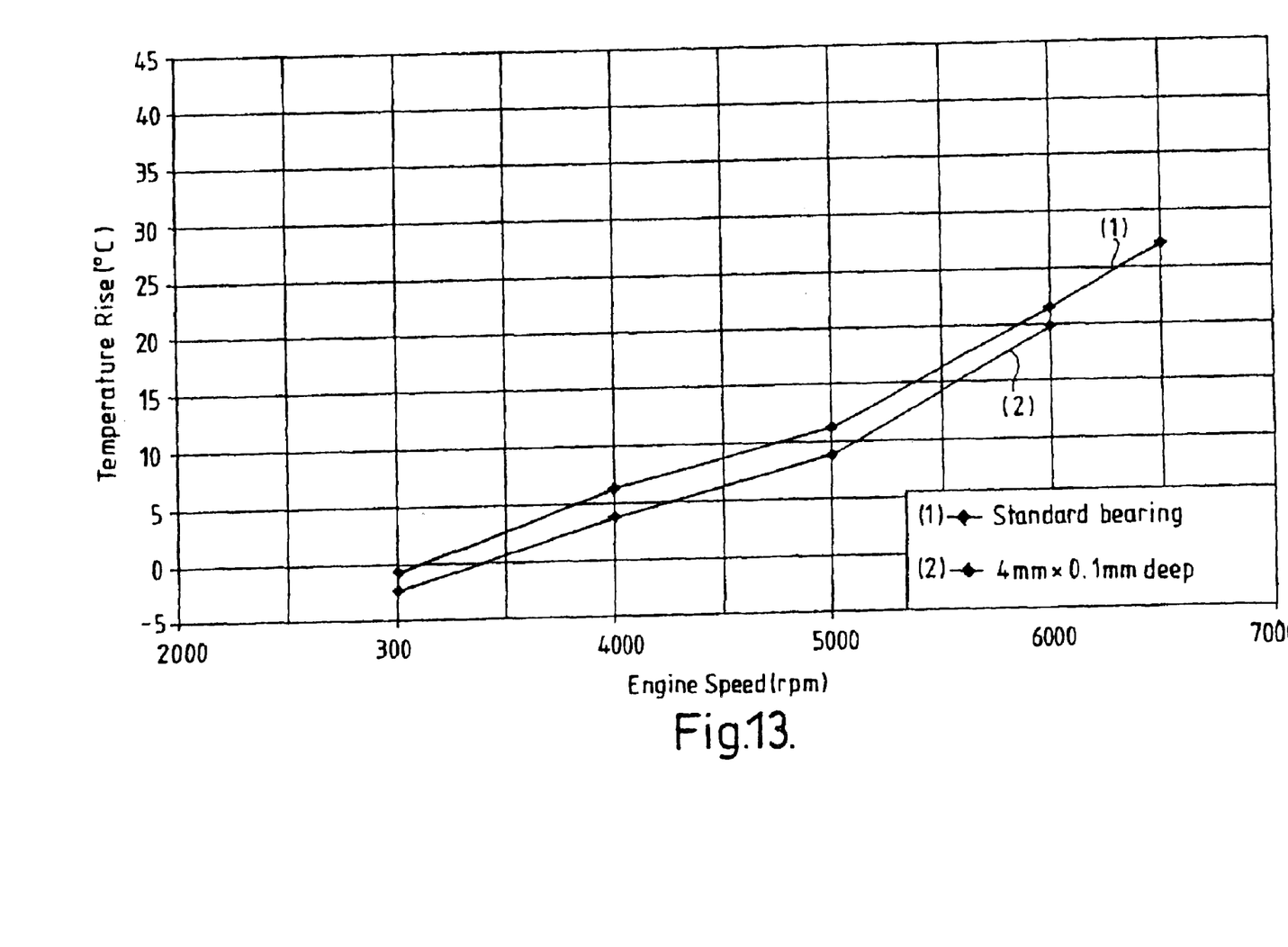
FIG. 13 which shows a graph similar to that shown in FIG. 12 but under different test conditions.

FIGS. 12 and 13 show graphs of bearing temperature rise for standard bearings (trace 1) and for bearings having axial end relieved portions of "l"=2 mm and depth "D"=0.1 mm (trace 2). As before, it is clear that the bearings according to the present invention demonstrate a reduction in bearing temperature rise at input oil temperatures of both 100° C. (FIG. 12) and 140° C. (FIG. 13), the oil supply pressure being 2 bar in both graphs.

Whilst engines may be operated up to high speeds when accelerating, an engine in a vehicle spends the great majority of its life operating at much lower speeds where the effect of the present invention is prominent. However, on motorways for example where high sustained vehicle and engine speeds are common, high oil temperatures are frequently observed especially with the use of cowlings and panels to improve the aerodynamics of vehicles being common nowadays and which inhibit the flow of cooling air over the engine oil pan. Consequently, any measures which can be taken to reduce bearing temperatures are beneficial. Thus, it is to be expected that the life of bearings and the associated crankshaft may be extended due to lower operating temperatures and consequent higher oil viscosity when using bearings according to the present invention.

What is claimed is:

1. A bearing for assembly about a journal comprising:
   a central bore; and
   at least two circumferential recesses extending in an axial direction and a radial direction in said central bore to reduce bearing contact with the journal, wherein said circumferential recesses are disposed substantially symmetrically about a length of the bearing and axially outward of an oil supply hole in the journal and extend about an entire outer circumference of the bearing, and wherein the total dimension of the circumferential recesses in the axial direction is about 5 to about 40% of an overall length of the bearing.

2. A bearing, as in claim 1, further comprising at least a backing material having an alloy lining thereon.

3. A bearing, as in claim 1, wherein the bearing is a separate bearing received in a housing and includes a back of said separate bearing associated with said housing thereby making said separate bearing substantially co-extensive with said housing in said axial direction.

4. A bearing, as in claim 3, wherein said separate bearing is a half bearing and two said separate bearings are received in said housing.

5. A bearing, as in claim 1, wherein a dimension of at least one of said circumferential recesses in said radial direction is about two to about fifteen times of a nominal total clearance between said central bore of the bearing and the journal.

6. A bearing, as in claim 1, wherein a dimension of at least one of said circumferential recesses in said axial direction is about ten to about thirty percent of said overall length of the bearing.

7. A bearing, as in claim 1, wherein at least one of said circumferential recesses includes a base parallel to an axis defined by said central bore.

8. A bearing, as in claim 7, wherein said base of said circumferential recess is stepped.

9. A bearing, as in claim 1, wherein at least one of said circumferential recesses includes a base that slopes relative to said axis.

10. A bearing, as in claim 1, wherein at least one of said circumferential recesses includes a base that is curved.

11. A bearing, as in claim 1, wherein at least one of said circumferential recesses is disposed inwardly from an axial end of the bearing and the bearing further includes a lip axially outwardly of said circumferential recess.

12. A bearing, as in claim 11, wherein a wall thickness at said lip is less than a total wall thickness of the bearing and greater than a wall thickness at said base of the circumferential recess.

13. A bearing, as in claim 1, wherein at least one of said circumferential recesses is disposed at an axial end of the bearing.

14. A bearing for assembly about a journal comprising:
   a central bore;
   at least one circumferential recess extending in an axial direction and a radial direction in said central bore to reduce bearing contact with the journal; and
   wherein said circumferential recess extends about an entire outer circumference of the bearing and a depth in the radial direction of the circumferential recess is about two to about fifteen times of a nominal total clearance between said central bore of the bearing and the journal while a length of the recess in the axial direction is about five to about forty percent of an overall length of the bearing.

15. A bearing, as in claim 14, wherein said circumferential recess is about ten to about thirty percent of said overall length of the bearing.

16. A bearing, as in claim 14, wherein said circumferential recess is positioned axially outwardly of an oil supply hole in the journal.

17. A bearing, as in claim 14, further including at least two circumferential recesses extending in an axial direction and a radial direction in said central bore.

18. A bearing, as in claim 17, wherein said circumferential recesses are disposed substantially symmetrically about a length of the bearing.

19. A bearing for assembly about a journal comprising:

a central bore having an axis and an outer circumference;

at least one circumferential recess extending in an axial direction and a radial direction in said central bore to reduce bearing contact with the journal, said circumferential recess extending about said outer circumference of the beating; and wherein said circumferential recess is disposed at an axial end of the bearing and further includes a base parallel to said axis defined by said central bore.

20. A bearing for assembly about a journal comprising:

a central bore; and at least one circumferential recess extending in an axial direction and a radial direction in said central bore to reduce bearing contact with the journal, wherein the total dimension of the circumferential recess in the axial direction is about 5 to about 40% of an overall length of the bearing.

* * * * *